United States Patent
Uchida

(10) Patent No.: US 8,379,258 B2
(45) Date of Patent: Feb. 19, 2013

(54) SYSTEM OPERATING UNDER WEB ENVIRONMENT AND METHOD OF CONTROLLING THE SAME

(75) Inventor: Takayuki Uchida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 209 days.

(21) Appl. No.: 12/766,551

(22) Filed: Apr. 23, 2010

(65) Prior Publication Data

US 2010/0293602 A1 Nov. 18, 2010

(30) Foreign Application Priority Data

May 13, 2009 (JP) ................................. 2009-117048

(51) Int. Cl.
*G06F 3/12* (2006.01)
*G03G 21/02* (2006.01)
*G03G 21/20* (2006.01)

(52) U.S. Cl. .............................. 358/1.15; 399/79; 399/83

(58) Field of Classification Search .................. 358/1.14, 358/1.15; 399/79, 82–83
See application file for complete search history.

(56) References Cited

U.S. PATENT DOCUMENTS

| | | | | |
|---|---|---|---|---|
| 7,258,498 | B2 * | 8/2007 | Hatta et al. ....................... | 400/62 |
| 7,613,412 | B2 * | 11/2009 | Harada et al. .................... | 399/81 |
| 7,796,282 | B2 * | 9/2010 | Yamakawa .................... | 358/1.14 |
| 7,860,892 | B2 * | 12/2010 | Sato ............................... | 707/796 |
| 7,877,427 | B2 * | 1/2011 | Nakagawa .................... | 707/899 |
| 8,184,315 | B2 * | 5/2012 | Yun ............................... | 358/1.15 |
| 2003/0172148 | A1 | 9/2003 | Simpson et al. | |
| 2004/0036908 | A1 | 2/2004 | Yagita | |
| 2005/0019077 | A1 * | 1/2005 | Hatta et al. ....................... | 400/62 |
| 2005/0134893 | A1 | 6/2005 | Han | |
| 2006/0023247 | A1 * | 2/2006 | Yamakawa .................... | 358/1.14 |
| 2006/0075334 | A1 * | 4/2006 | Sato ............................... | 715/523 |
| 2006/0279795 | A1 * | 12/2006 | Kuwahara ....................... | 358/401 |
| 2007/0070401 | A1 * | 3/2007 | Okamoto et al. ............. | 358/1.15 |
| 2008/0256630 | A1 * | 10/2008 | Fujikawa ......................... | 726/21 |
| 2008/0288507 | A1 * | 11/2008 | Nakagawa ....................... | 707/10 |
| 2009/0009809 | A1 * | 1/2009 | Kita ............................... | 358/1.16 |
| 2009/0080013 | A1 | 3/2009 | Sato | |
| 2009/0195820 | A1 * | 8/2009 | Sugimoto et al. ............. | 358/1.15 |
| 2009/0315904 | A1 * | 12/2009 | Sugimoto et al. ............. | 345/531 |
| 2010/0290081 | A1 * | 11/2010 | Uchida ........................... | 358/1.15 |

FOREIGN PATENT DOCUMENTS

| | | |
|---|---|---|
| JP | 2004-054909 | 2/2004 |
| JP | 2005-004328 | 1/2005 |
| JP | 2006-323610 | 11/2006 |

OTHER PUBLICATIONS

U.S. Appl. No. 12/766,537, filed Apr. 23, 2010.

\* cited by examiner

*Primary Examiner* — Christian Laforgia

(74) *Attorney, Agent, or Firm* — Fitzpatrick, Cella, Harper & Scinto

(57) ABSTRACT

In a system which operates under a Web environment in which a service providing server controls the provision of a service with operating a Web server and a client apparatus provides service with operating a Web browser, which are connected via a network. The service providing server stores the history of a job for providing the service with the user ID of a user who requests the service, then acquires, from stored histories, a history having a user ID matched to the user ID of a user who sends a request to browse the history of a job. When the Web server receives the browsing request from the user of the client apparatus via the Web browser, the service providing server creates a file for distributing updated information based on the acquired history, and transmits the file to the Web browser.

9 Claims, 19 Drawing Sheets

FIG. 13

| USER ID 1003 | JOB IDENTIFICATION ID 1004 | DOCUMENT NAME 1005 | STATUS 1006 | UPDATED TIME 1007 | URL 1008 |
|---|---|---|---|---|---|
| 101 | 1 | doc1 | ON PROCESSING | 2008/10/10 15:00:00 | |
| 101 | 2 | doc2 | ON PROCESSING | 2008/10/10 15:00:00 | |
| 102 | 3 | doc3 | ON PROCESSING | 2008/10/10 15:00:00 | |
| 101 | 1 | doc1 | ON PRINTING | 2008/10/10 15:00:01 | http://xxxxxprintservice.jp/joblist |
| 101 | 2 | doc2 | ON PRINTING | 2008/10/10 15:00:01 | http://xxxxxprintservice.jp/joblist |
| 102 | 3 | doc3 | ON PRINTING | 2008/10/10 15:00:01 | http://xxxxxprintservice.jp/joblist |

| USER ID | JOB ID | DOCUMENT NAME | STATUS | UPDATED TIME | URL |
|---|---|---|---|---|---|
| 101 | 1 | doc1 | ON PROCESSING | 2008/10/10 15:00:00 | |
| 101 | 2 | doc2 | ON PROCESSING | 2008/10/10 15:00:00 | |
| 102 | 3 | doc3 | ON PROCESSING | 2008/10/10 15:00:00 | |
| 101 | 1 | doc1 | ON PRINTING | 2008/10/10 15:00:01 | http://xxxxprintservice.jp/joblist |
| 101 | 2 | doc2 | ON PRINTING | 2008/10/10 15:00:01 | http://xxxxprintservice.jp/joblist |
| 102 | 3 | doc3 | ON PRINTING | 2008/10/10 15:00:01 | http://xxxxprintservice.jp/joblist |
| 101 | 2 | doc2 | ERROR | 2008/10/10 15:00:03 | http://printerA.example.com/_job/id=20081010150003 |

```
<feed xmlns="http://www.w3.org/2005/Atom">                                    ──1402
 <title>LIST OF JOBS BEING PRINTED BY PRINT SERVICE</title>                   ──1403
 <id>tag:xxxxprintservice.jp,2008-12-01:/joblist/feed</id>                    ──1404
 <link href="http://xxxxprintservice.jp"/>
 <updated>2008-12-01T15:00:010+09:00</updated>                                ──1405

<entry>
  <title>doc2</title>                                                         ──1406
  <id>tag:xxxxprintservice.jp,2008-12-01-1500:/job/doc2</id>                  ──1407
  <summary>ERROR</summary>                                                    ──1408
  <modified>2008-12-01T15:00:01+09:00</modified>                              ──1409
  <link>http://printerA.example.com/_job/id=20081010150003</link>             ──1410
  <JOB ID>2<JOB ID>                                                           ──1411
 </entry>

</feed>
```

FIG. 15A

| USER ID | JOB ID | DOCUMENT NAME | STATUS | UPDATED TIME | URL |
|---|---|---|---|---|---|
| 101 | 1 | doc1 | ON PROCESSING | 2008/10/10 15:00:00 | |
| 101 | 2 | doc2 | ON PROCESSING | 2008/10/10 15:00:00 | |
| 102 | 3 | doc3 | ON PROCESSING | 2008/10/10 15:00:00 | |
| 101 | 1 | doc1 | ON PRINTING | 2008/10/10 15:00:01 | http://xxxxprintservice.jp/joblist |
| 101 | 2 | doc2 | ON PRINTING | 2008/10/10 15:00:01 | http://xxxxprintservice.jp/joblist |
| 102 | 3 | doc3 | ON PRINTING | 2008/10/10 15:00:01 | http://xxxxprintservice.jp/joblist |
| 101 | 2 | doc2 | ERROR | 2008/10/10 15:00:03 | http://xxxxprintservice.jp/doclist?jobid=2 |

```
<feed xmlns="http://www.w3.org/2005/Atom">
  <title>LIST OF JOBS BEING PRINTED BY PRINT SERVICE</title>       1503
  <id>tag:xxxxprintservice.jp,2008-12-01:/joblist/feed</id>
  <link href="http://xxxxprintservice.jp"/>
  <updated>2008-12-01T15:00:01+09:00</updated>       1505

<entry>
    <title>doc2</title>       1506
    <id>tag:xxxxprintservice.jp,2008-12-01-1500:/job/doc2</id>       1507
    <summary>ERROR</summary>       1508
    <modified>2008-12-01T15:00:01+09:00</modified>       1509
    <link>http://xxxxprintservice.jp/doclist?jobid=2</link>       1510
    <JOB ID>2</JOB ID>       1511
  </entry>

</feed>
```

1501 — 1502, 1504

SYSTEM OPERATING UNDER WEB ENVIRONMENT AND METHOD OF CONTROLLING THE SAME

BACKGROUND OF THE INVENTION

1. Field of the Invention

The present invention relates to a system operating under a Web environment and a method of controlling the same and to a processing method of enabling to know a job status on a Web browser. More particularly, the present invention relates to a print server processing method of enabling to know a job status on a Web browser in a print system which prints under a Web environment.

2. Description of the Related Art

SaaS (Software as a Service) which provides a software function as a service on a network has become widespread. In addition to SaaS, a thin client that makes only a browser run on a PC (Personal Computer) is also expected to become widespread. In SaaS, it is unnecessary to install applications in a client PC. Introducing a thin client is very advantageous for a user because, for example, it reduces the management cost of software to be distributed to clients and prevents information leakage by obviating the needs for storing data in a client environment. SaaS and the client environment where only a browser runs are services on a WWW (World Wide Web) platform. There is no doubt that future services will be provided to run on the WWW platform.

Under these circumstances, response to a Web print service for providing a print service on the WWW platform, which is one of application examples of SaaS, is a very important problem for a print system.

In the Internet Web technology field mainly including information processing apparatuses, a start has recently been made at heavily using XML applications of, for example, RSS/Atom used to distribute hot news and the like. Monitoring target updated information/summary information is distributed as an RSS/Atom feed so that a Web browser can display the information of the distributed feed (the Web browser operates as an RSS reader). Some print systems acquire updated information using the RSS technology (for example, Japanese Patent Laid-Open No. 2006-323610). Japanese Patent Laid-Open No. 2006-323610 allows the administrator to do remote and centralized monitoring when the hardware/software configuration or setting information of a printing apparatus has been updated.

However, when, for example, monitoring print jobs in a print system, a user must monitor only print jobs executed by himself/herself (referring to print jobs executed by another person is prohibited). In Japanese Patent Laid-Open No. 2006-323610, it is possible to distribute RSS feeds to a specific user (administrator) or many specified users (users registered in advance). However, since an RSS feed is created and stored in a storage device at a timing the monitoring target information (the statuses of all jobs) has been updated, it is impossible to distribute only the information of a job executed by a user who has sent an RSS feed acquisition request.

SUMMARY OF THE INVENTION

The present invention provides a system which operates under a Web environment to notify a user who has sent a request for acquiring a job status, of the job status of only a job executed by the user, and a method of controlling the same. Especially, the present invention provides a print system which provides a print service in a browser-based environment and on the WWW platform so as to notify a user of the job status of only a print job executed by the user, and a method of controlling the same.

In order to solve the above-described problems, the present invention provides an information processing apparatus in a system operating under a Web environment in which the information processing apparatus controlling to provide a service with operating a Web server and a client apparatus provided the service with operating a Web browser are connected via a network. The information processing apparatus comprises: a storage unit configured to store a history of a job for providing the service with a user ID of a user who requests the service; an acquisition unit configured to acquire a history having a user ID match to a user ID of a user who sends a request of browsing a history of a job, from histories stored in the storage unit, when the Web server receives the request of browsing from the user of the client apparatus via the Web browser; a creation unit configured to create a file for distributing update information based on the history acquired by the acquisition unit; and a transmission unit configured to transmit the file created by the creation unit to the Web browser.

The present invention also provides a method of controlling an information processing apparatus in a system operating under a Web environment in which the information processing apparatus controlling to provide a service with operating a Web server and a client apparatus provided the service with operating a Web browser are connected via a network. The method comprises the steps of: storing a history of a job for providing the service with a user ID of a user who requests the service; acquiring a history having a user ID match to a user ID of a user who sends a request of browsing a history of a job, from histories stored in the storing step, when the Web server receives the request of browsing from the user of the client apparatus via the Web browser; creating a file for distributing update information based on the history acquired in the acquiring step; and transmitting the file created in the creating step to the Web browser.

The present invention also provides a computer-readable storage medium storing a program which causes a computer to execute steps of above method of controlling an information processing apparatus.

The present invention further provides a system operating under a Web environment in which a service providing server controlling to provide a service with operating a Web server and a client apparatus provided the service with operating a Web browser are connected via a network. The service providing server in the system comprises: a storage unit configured to store a history of a job for providing the service with a user ID of a user who requests the service; an acquisition unit configured to acquire a history having a user ID match to a user ID of a user who sends a request of browsing a history of a job, from histories stored in the storage unit, when the Web server receives the request of browsing from the user of the client apparatus via the Web browser; a creation unit configured to create a file for distributing update information based on the history acquired by the acquisition unit; and a transmission unit configured to transmit the file created by the creation unit to the Web browser.

The present invention further more provides a method of controlling a system operating under a Web environment in which a service providing server controlling to provide a service with operating a Web server and a client apparatus provided the service with operating a Web browser are connected via a network. The method comprises the steps of: storing a history of a job for providing the service with a user ID of a user who requests the service; acquiring a history having a user ID match to a user ID of a user who sends a request of browsing a history of a job, from histories stored in the storing step, when the Web server receives the request of browsing from the user of the client apparatus via the Web browser; creating a file for distributing updated information based on the history acquired in the acquiring step; and transmitting the file created in the creating step to the Web browser.

According to the present invention, it is possible to provide a system which operates under a Web environment to notify a user who has sent a request for acquiring a job status, of the job status of only a job executed by the user, and a method of controlling the same.

For example, a user who has sent a print job status acquisition request using only the Web technology can receive a notification of the print job status of only a job executed by the user. It is therefore possible to monitor a job on printing by a print service under a client environment including only a Web browser.

Further features of the present invention will become apparent from the following description of exemplary embodiments with reference to the attached drawings.

BRIEF DESCRIPTION OF THE DRAWINGS

FIG. 13 is a table showing a detailed example of history information;

FIGS. 14A and 14B are views showing an example of history information and an example of an RSS file to be distributed when an error has occurred during printing;

FIGS. 15A and 15B are views showing an example of history information and an example of an RSS file to be distributed when an error has occurred before print job sending;

DESCRIPTION OF THE EMBODIMENTS

An embodiment for carrying out the present invention will now be described with reference to the accompanying drawings. Note that in this embodiment, a print system will be explained as a system which operates under a Web environment to provide a service in a browser-based environment and on the WWW platform. However, the present invention is not limited to this.

In this embodiment, the term "RSS" stands for "RDF Site Summary", "Rich Site Summary", "Really Simple Syndication" or the like. "RSS" means distributing and publishing site updated information in a broad sense, or a format to be distributed in a narrow sense. The above-described three shorts represent different groups of the format, but their objects are same in a broad sense. In this embodiment, an RSS includes the summary of device status information (updated information), and a URL that is a reference destination address for details of the summary. If the summary is sufficient for understanding, the user only reads the summary of the RSS. On the other hand, to know details from the summary, he/she can obtain detailed information from a Web page on a server (or device) by referring to the URL contained in the RSS.

The term "RSS reader" indicates a reader program dedicated to read a subscribed RSS (set to be acquired). To refer to a URL contained in an RSS, the browser activates the RSS reader. Recently, however, the browser itself includes an RSS reader. Hence, for example, the browser can seamlessly browse a URL referred from the RSS reader (browser's RSS pane).

In this embodiment, as a means for outputting a printer error notification, the RSS/Atom technique is used because of its high degree of freedom. Currently, RSS/Atom is mainly used to distribute hot news and the like in the Internet Web technology field mainly including information processing apparatuses. A distributed RSS/Atom feed can be displayed on a Web browser. Hence, the Web browser operates as the RSS reader.

<Arrangement Example of Print Network of Embodiment>

Figure 1:
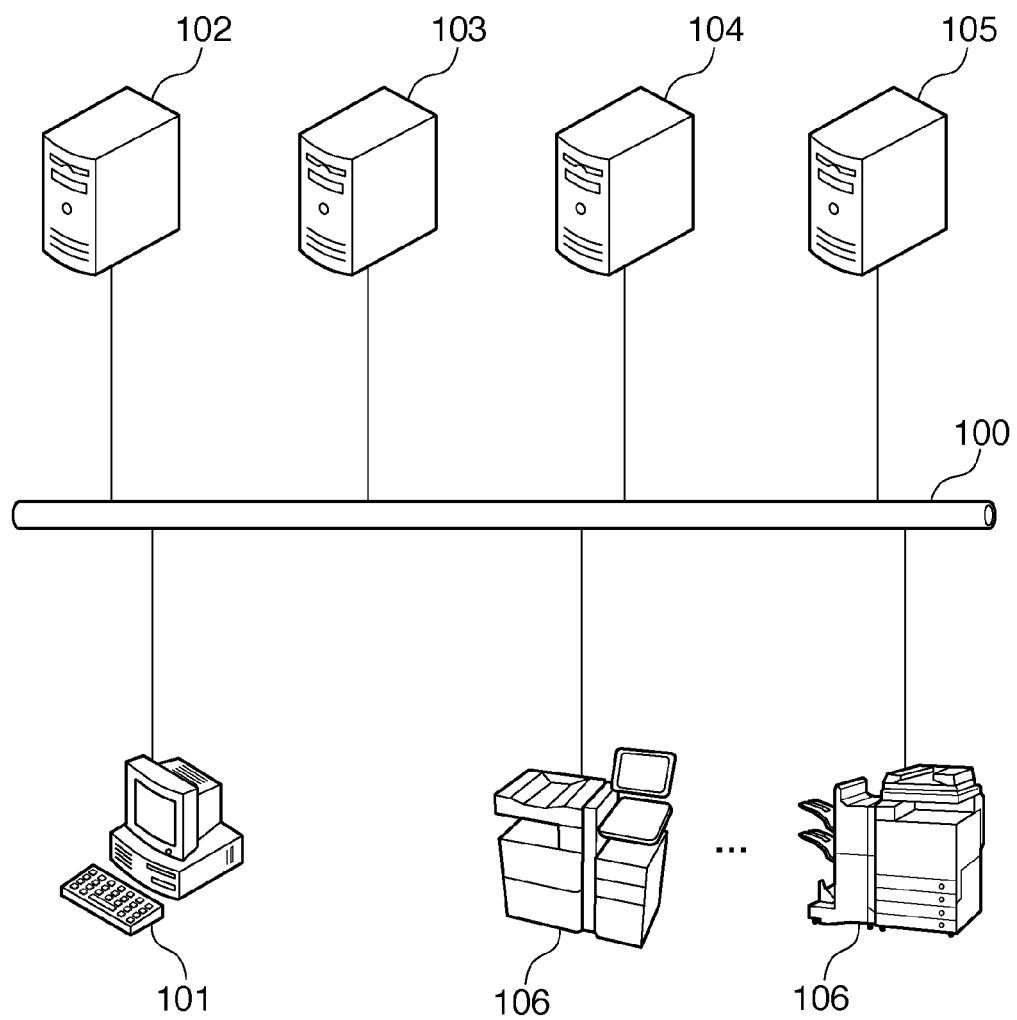
FIG. 1 is a view showing an example of the arrangement of a network.

In a print network shown in FIG. 1, a client apparatus 101, save job creation server 102, authentication server 103, print server 104, and database server 105 are connected to each other via a network 100. A printer, in other words, an image forming apparatus 106 serving as a service providing device of this embodiment is also connected to the network 100.

A client application (for example, Web browser) for requesting printing or print job progress confirmation is stored in the client apparatus 101 in an executable state. The save job creation server 102 creates a save job, and enters it in the save job management service of the print server 104. The authentication server 103 manages user information, and performs authentication. The print server 104 receives a request from the client application, and transmits the save job managed by the save job management service to the image forming apparatus 106. The print server 104 also records, in the database server 105, print job process/result information sent from the image forming apparatus 106. The database server 105 stores and manages save jobs, print setting information, and midway process and result information of print jobs.

The image forming apparatus 106 is a print device serving as a physical apparatus which receives save job data from the print server 104, and analyzes and prints the save job data.

Printing apparatuses of every description including a laser beam printer using an electrophotographic scheme, an inkjet printer using an inkjet scheme, and a printer using a thermal transfer scheme can be adopted as the image forming apparatus 106.

Note that communication between the apparatuses included in this system can be wired communication using Ethernet® cables or the like, or wireless communication using radio waves, light, or the like.

<Arrangement Example of Information Processing Apparatus of Embodiment>

Figure 2:
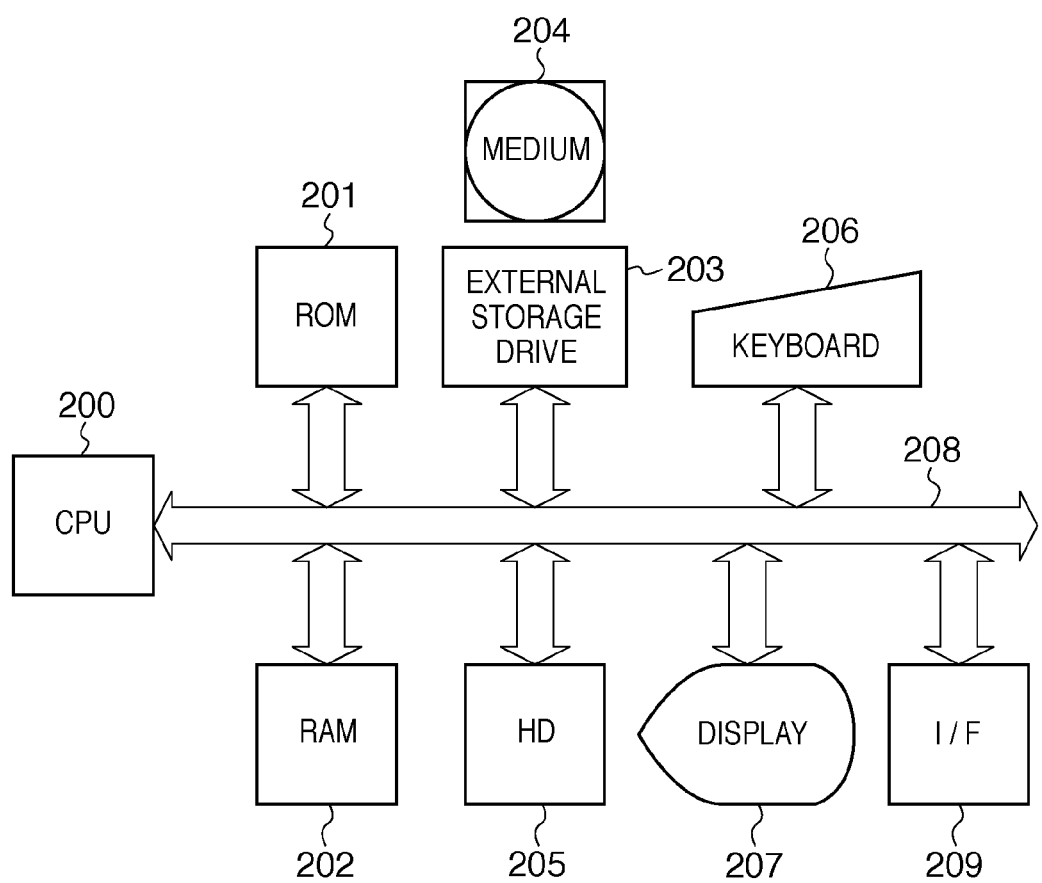
FIG. 2 is a block diagram showing the hardware configuration of an information processing apparatus.

FIG. 2 is a block diagram showing an example of the hardware configuration of an information processing apparatus which is a computer serving as the client apparatus 101, save job creation server 102, authentication server 103, print server 104, or database server 105 in the print system according to this embodiment.

Referring to FIG. 2, a CPU 200 controls the overall apparatus, and executes application programs, OS, and the like stored in a hard disk (HDD) 205 to implement their functions. The CPU 200 also controls to temporarily store, in a RAM 202, information, files, and the like necessary for program execution. A ROM 201 stores programs such as a basic I/O program, and various kinds of data such as font data and template data to be used for document processing. The RAM 202 serves as a temporary storage for temporarily storing information, files, and the like necessary for program execution, and functions as, for example, the main memory or work area of the CPU 200. The hard disk (HDD) 205 is one of external storages, and functions as a mass storage. The HDD 205 stores application programs, Web service programs, database programs, authentication service programs, printer driver programs, OS, network printer control programs, associated programs, and the like.

A display 207 displays a screen to display a command input from a keyboard 206, a printer status, or the like. An external device I/F 209 is used to connect a printer, USB device, or peripheral device. The keyboard 206 is used to input data or an instruction. A system bus 208 connects the constituent elements, and flows control information and data.

Note that the arrangement of the information processing apparatus is merely an example, and is not limited to the arrangement example shown in FIG. 2. For example, the storage location of data or a program can be changed to the ROM, RAM, or HDD in accordance with its features.

<Arrangement Example of Image Forming Apparatus of Embodiment>

Figure 3:
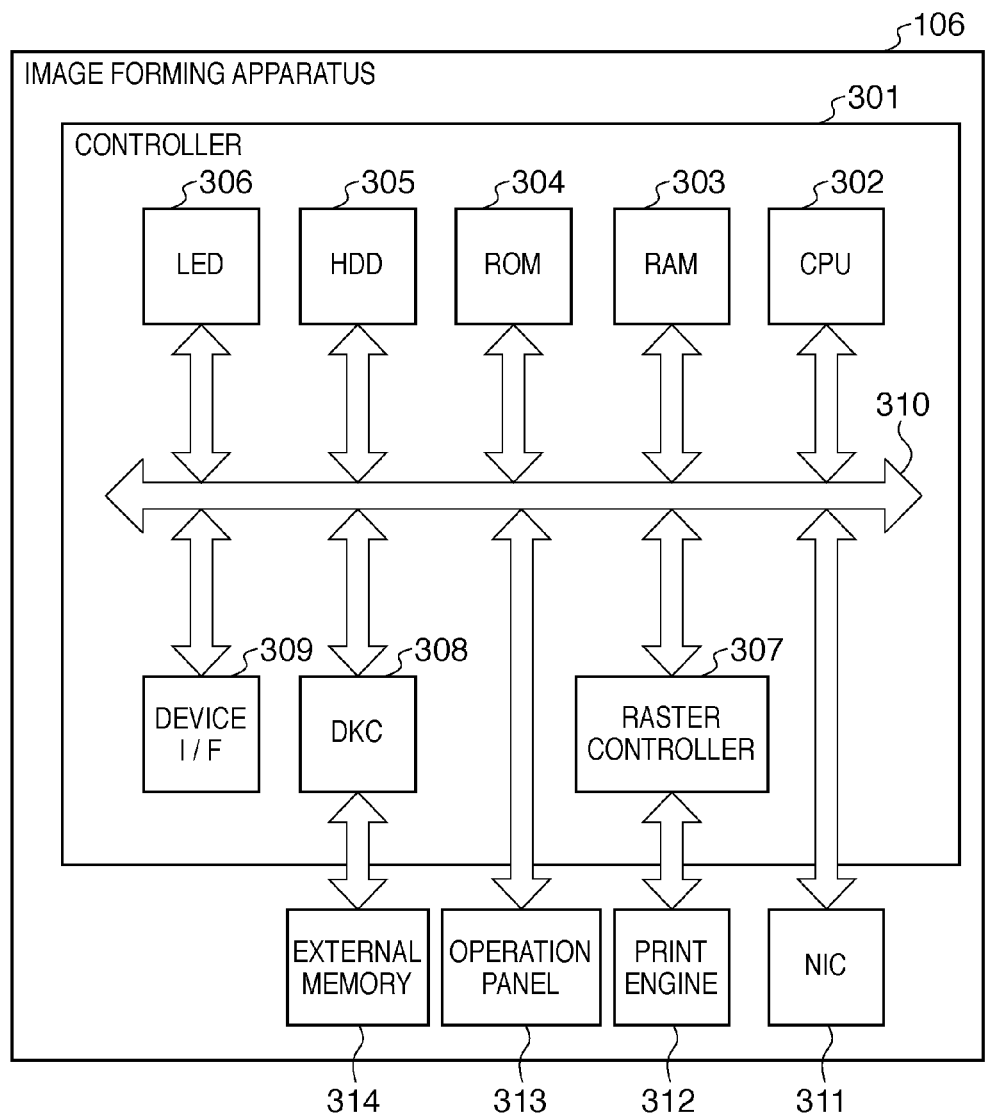
FIG. 3 is a block diagram showing an example of the arrangement of an image forming apparatus.

In the hardware configuration of the image forming apparatus 106 according to the embodiment shown in FIG. 3, a controller 301 serves as the control system of the image forming apparatus. A CPU 302 controls the overall apparatus, and executes general control of access to various kinds of devices connected to a system bus 310. This control is done based on control programs and the like stored in a ROM 304, or control programs, resources (resource information), and the like stored in an external memory 314 connected via a disk controller (DKC 308). A RAM 303 functions as, for example, the main memory or work area of the CPU 302. The RAM 303 is configured to be able to expand the memory capacity using an optional RAM connected to an expansion port (not shown). An external storage unit 305 such as an HDD functions as a mass memory, and stores Web service programs, associated programs, and the like.

An operation panel (operation unit) 313 includes a user interface for pull print operation and a pull-print switching button. The operation panel 313 also includes indicators such as an LED 306, and a liquid crystal panel and buttons to be used to, for example, set the operation mode or the like of the image forming apparatus 106, display the operation status of the image forming apparatus 106, and designate copy. The information processing apparatus exchanges data with an external device via a network interface card (NIC) 311. A print engine 312 shown in FIG. 3 uses a known print technique. Examples of preferable implementation systems are an electrophotographic scheme, inkjet scheme, and sublimation (thermal transfer) scheme. A raster controller 307 converts print data that is the PDL or PDF language into image data. A device I/F 309 serves as a connection I/F to an external device connectable via a USB or the like.

<Arrangement Example of Print System of Embodiment>

Figure 4:
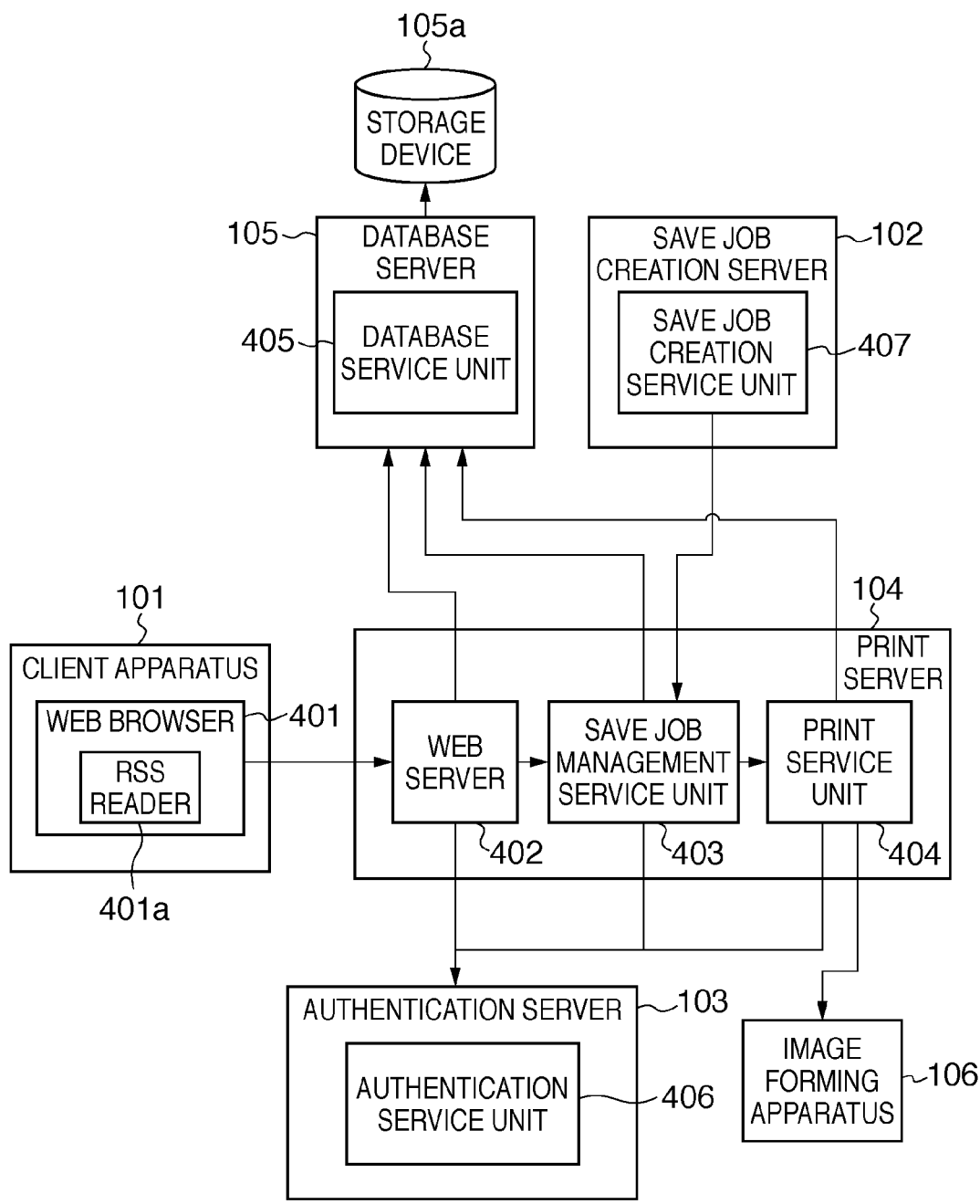
FIG. 4 is a block diagram showing an example of the arrangement of a system.

Referring to FIG. 4, a Web browser 401 is a program which requests Web page acquisition of a Web server, and displays a response result. The Web browser 401 is executed by the CPU 200 of the client apparatus 101. The Web browser 401 has an RSS reader function. The Web browser itself may have the function of an RSS reader 401a, like Internet Explorer or Firefox. Alternatively, the Web browser and the RSS reader may be separate.

A save job creation service unit 407 of the save job creation server 102 creates a save job. The save job is form data containing user-designated data, or printable data created by a document creation application. Note that the save job includes save job information and save job data. In this embodiment, the simple description "save job" means that it includes both save job information and save job data. The save job information and save job data will be described later. The save job creation service unit 407 transmits the save job to a save job management service unit 403 of the print server 104 periodically or at a user-designated timing. The save job management service unit 403 registers, in a database service unit 405 of the database server 105, the save job information of the save job received from the save job creation service unit 407. The database service unit 405 stores the save job information in a storage device 105a. The save job management service unit 403 also stores the save job data in the storage device 105a.

Upon receiving a login request from the Web browser 401, a Web server 402 serving as a service providing server in the print server 104 performs authentication by inquiring of the authentication server 103. An authentication service unit 406 of the authentication server 103 checks whether the user information of a user who is going to operate the Web browser 401 coincides with user information registered in the authentication service unit 406. Upon receiving a save job acquisition request from the Web browser 401, the Web server 402 acquires, from the database service unit 405 of the database server 105, a save job list the authenticated user can refer to. The Web server 402 returns, to the Web browser 401, a page to display the acquired save job list. Upon receiving a print request from the Web browser 401, the Web server 402 sends the print request to the save job management service unit 403. The save job management service unit 403 acquires save job information from the database service unit 405, judges whether the authenticated user can print the save job, and if printable, transmits the save job to a print service unit 404. Upon receiving the save job, the print service unit 404 transmits save job data to the image forming apparatus 106.

(Arrangement Example of Web Server 402)

Figure 5:
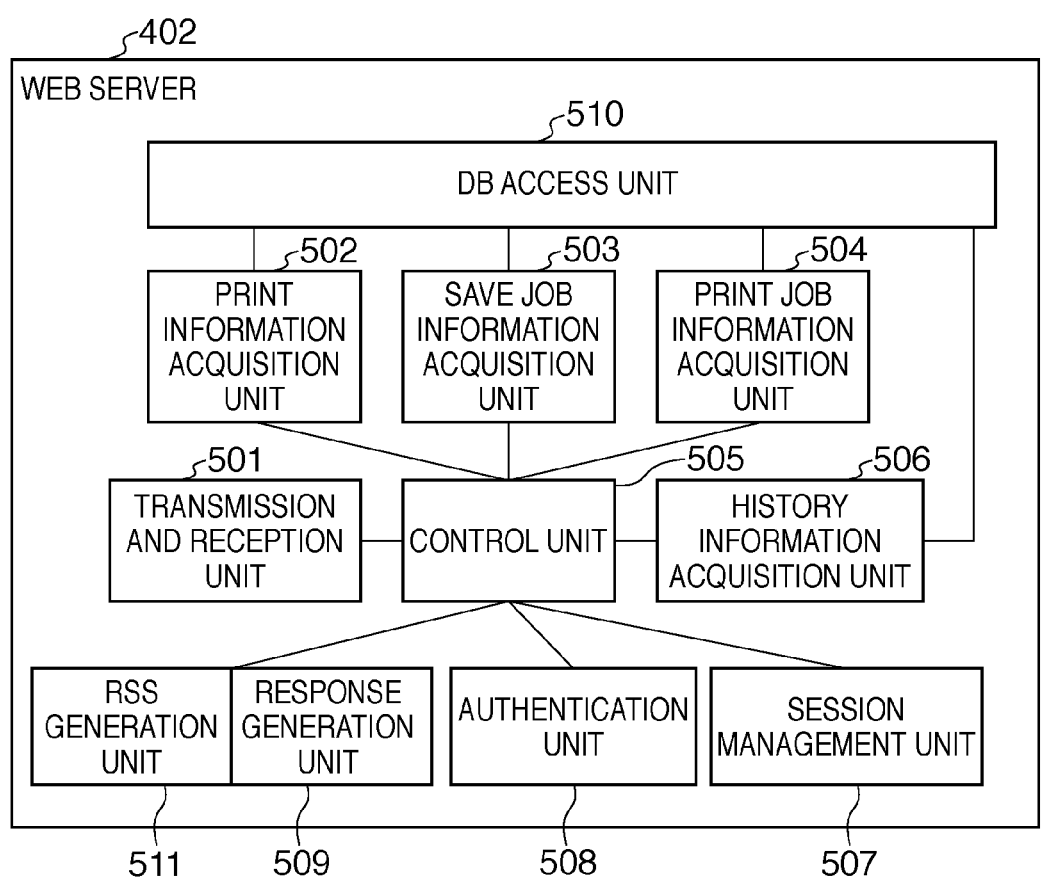
FIG. 5 is a block diagram showing an example of the arrangement of a Web server in a print server.

Referring to FIG. 5, a control unit 505 controls the processing of each unit of the Web server 402. A transmission and reception unit 501 receives a login request, print request, RSS feed acquisition request, and the like from the Web browser 401. A print information acquisition unit 502 acquires print save information from the database service unit 405 using a DB access unit 510. A save job information acquisition unit 503 acquires save job information from the database service unit 405 using the DB access unit 510. A print job information acquisition unit 504 acquires print job information and print job process/result information from the database service unit 405 using the DB access unit 510. A history information acquisition unit 506 acquires the history information of the midway process and result of a print job from the database service unit 405 using the DB access unit 510. When an authentication unit 508 has succeeded authentication, a session management unit 507 creates and manages session information for the request. Upon receiving a login request from the Web browser 401, the authentication unit 508 asks the authentication service unit 406 about whether the login request is proper (for example, whether it is a request from an authenticated user). A response generation unit 509 generates a response page to the Web browser 401 in correspondence with each request. Upon receiving an RSS feed acquisition request from the RSS reader, a RSS generation unit 511 generates an RSS feed. Note that in this embodiment, RSS/Atom will be described as RSS in general. The RSS generation unit 511 can also generate an Atom feed.

(Arrangement Example of Save Job Management Service Unit 403)

Figure 6:
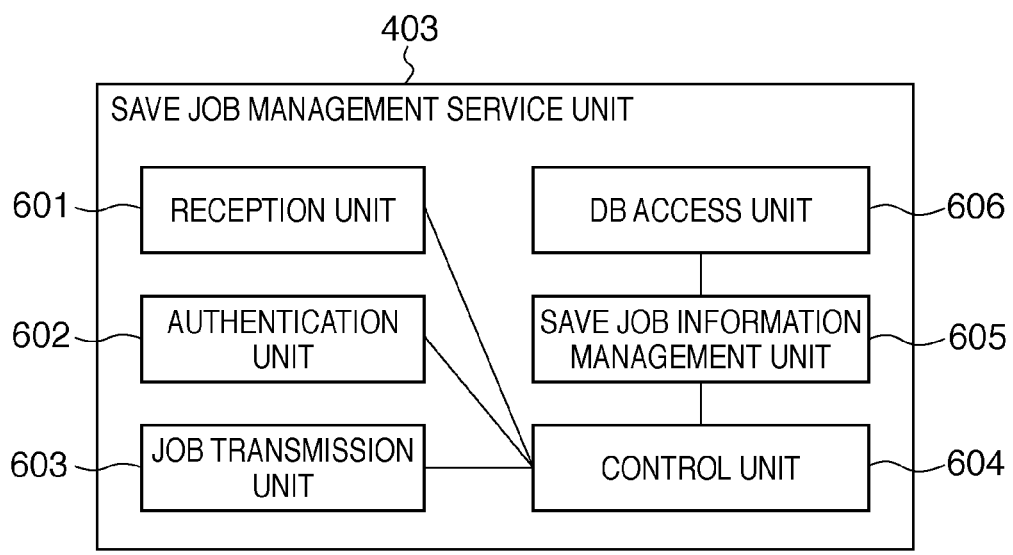
FIG. 6 is a block diagram showing an example of the arrangement of the save job management service unit of the print server.

Referring to FIG. 6, a control unit 604 controls the processing of each unit of the save job management service unit 403. A reception unit 601 receives a save job sent from the save job creation service unit 407 or a print request from the Web server 402. Upon receiving a save job, a save job information management unit 605 registers save job data and save job information in the database service unit 405 using a DB access unit 606. For a print request, save job data and save job information are acquired from the database service unit 405. An authentication unit 602 asks the authentication service unit 406 about whether the request is proper (for example, whether it is a request from an authenticated user). For a print request, a job transmission unit 603 sends the save job to the print service unit 404.

(Arrangement Example of Print Service Unit 404)

Figure 7:
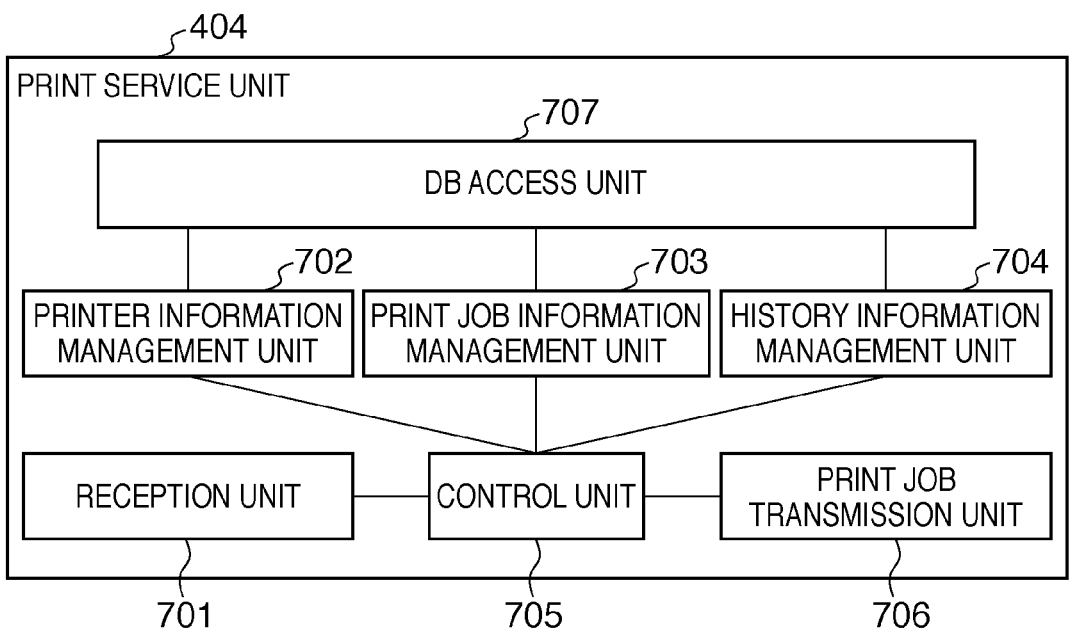
FIG. 7 is a block diagram showing an example of the arrangement of the print service unit of the print server.

Referring to FIG. 7, a control unit 705 controls the processing of each unit of the print service unit 404. A reception unit 701 receives a save job from the save job management service unit 403. A print job transmission unit 706 transmits save job data to the image forming apparatus 106. The control unit 705 also waits for a notification of print job process/result information from the image forming apparatus 106. When the control unit 705 has received a notification of print job process/result information from the image forming apparatus 106, a print job information management unit 703 updates a corresponding print job information record of a print job information table in the database service unit 405 using a DB access unit 707. A history information management unit 704 creates the history information record of the print job, and adds it to a history information table in the database service unit 405 using the DB access unit 707.

<Arrangement Examples of Tables Managed by Database Service Unit 405>

(Arrangement Example of Save Job Information Table)

Figure 8:
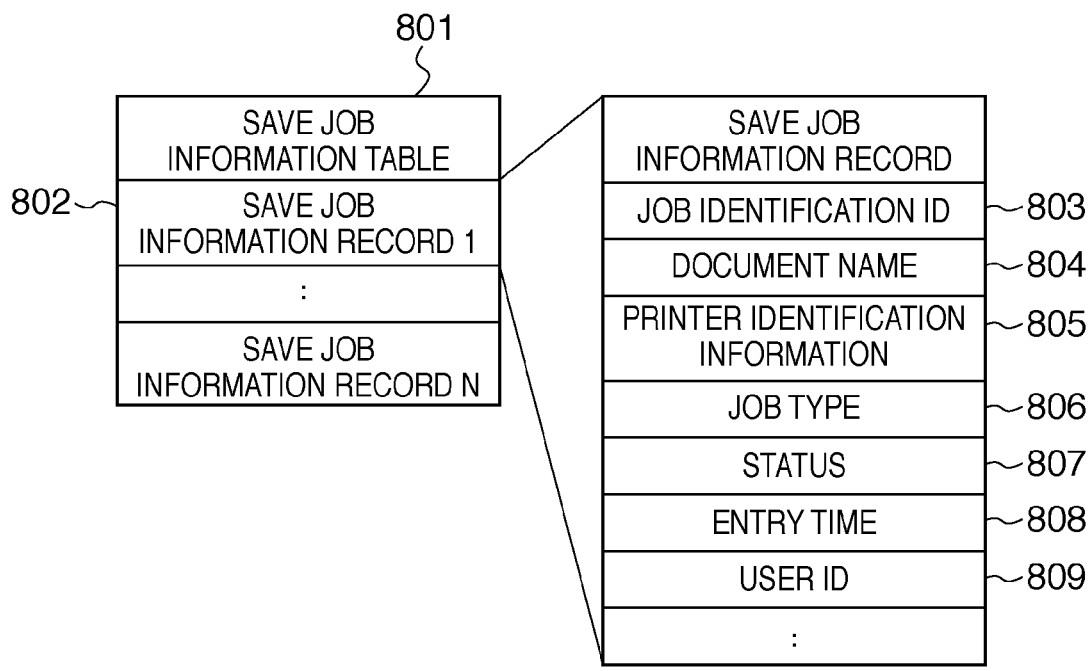
FIG. 8 is a view showing an example of the arrangement of a save job information table.

Referring to FIG. 8, a save job information table 801 stores save job information. This table includes a plurality of save job information records 802. A job identification ID 803 is used to uniquely identify each save job. The ID is unique in the print system of this embodiment.

Save job data specified by the job identification ID 803 is stored as items 804 to 809. The document name 804 is the same of the save job. The printer identification information 805 is used to specify the image forming apparatus 106 for performing print processing. The IP address, host name, or the like of the image forming apparatus is used as the identification information. The job type 806 is the type of the description language of the save job. Examples of the type are PDL, PDF, and form description language. The status 807 is the status of the print job, and stores status information representing a status such as "on waiting", "on printing", "normal termination", or "error termination". The entry time 808 is the date/time the save job creation service unit 407 entered the save job in the save job management service unit 403, and the save job management service unit 403 stores the save job in the database service unit 405. The user ID 809 is information to be used to the owner of the save job.

(Arrangement Example of Print Job Information Table)

Figure 9:
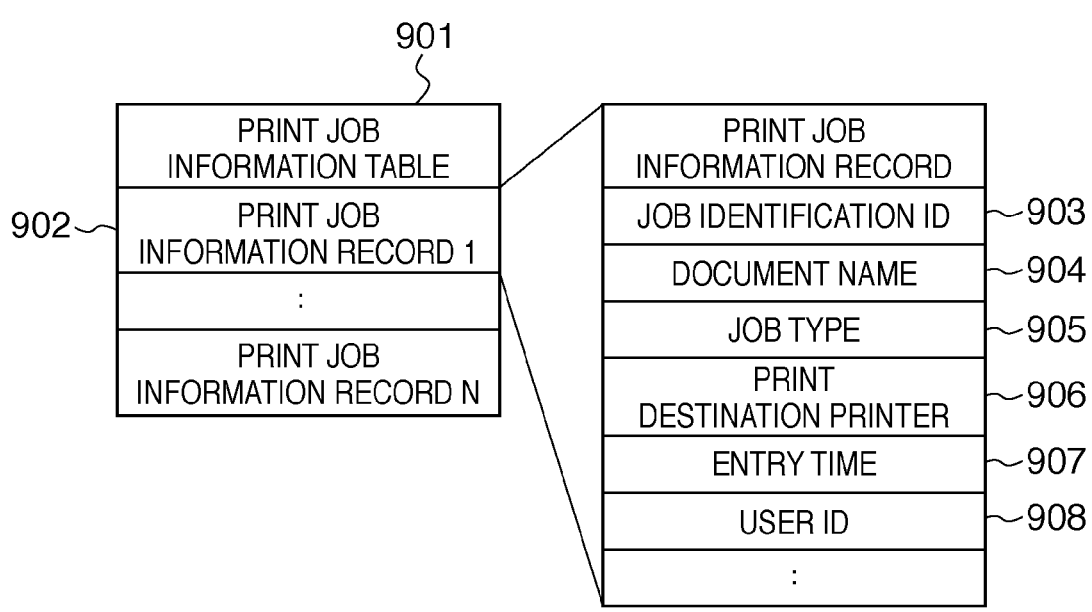
FIG. 9 is a view showing an example of the arrangement of a print job information table.

Referring to FIG. 9, a print job information table 901 stores print job information. This table includes a plurality of print job information records 902. A job identification ID 903 is used to uniquely identify each print job. There are a document name 904 of the print job and a status 905 that stores the print status of the job. For example, when the image forming apparatus 106 has started printing, the status 905 changes to "on printing". When printing has ended, the status 905 stores information representing a status such as "normal termination" or "error termination", indicating the result of printing. An entry time 907 is the date/time the print service unit 404 received a print request. A user ID 908 is identification information (for example, user name, user ID, or password) representing the user authenticated by the authentication unit 602 of the save job management service unit 403, session information generated by the Web server 402, or the like.

(Arrangement Example of History Information Table)

Figure 10:
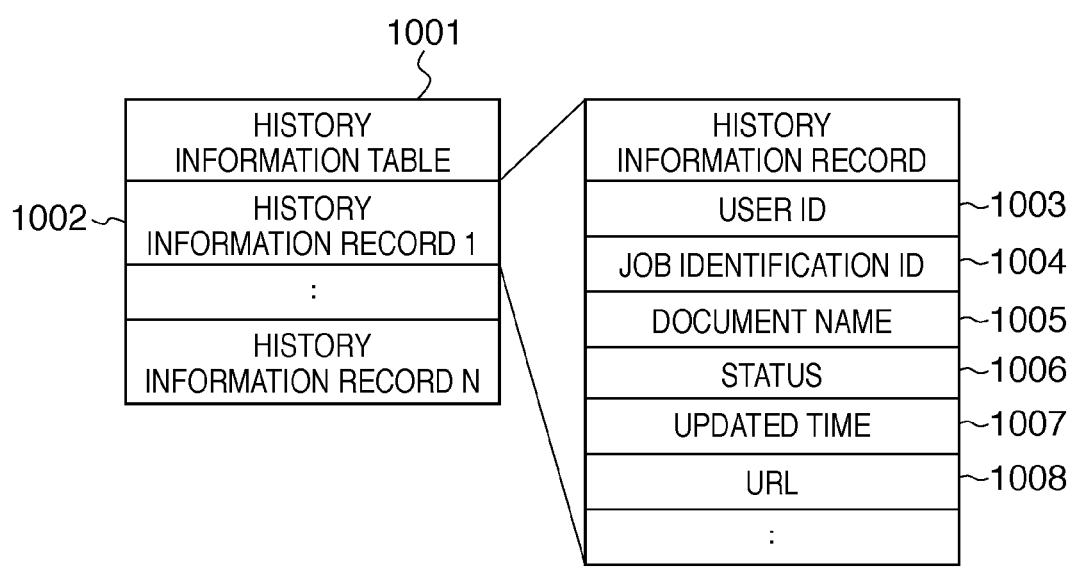
FIG. 10 is a view showing an example of the arrangement of a history information table.

Referring to FIG. 10, a history information table 1001 stores print job information. This table includes a plurality of history information records 1002. A user ID 1003 is information to be used to identify the owner of the print job, and coincides with the user ID 908. A job identification ID 1004 is used to uniquely identify the print job. There are a document name 1005 and a status 1006 that stores the print status of the job. For example, when the image forming apparatus 106 has started printing, the status 1006 changes to "on printing". When printing has ended, the status 1006 stores information representing a status such as "normal termination" or "error termination", indicating the result of printing. An updated time 1007 is the date/time the print service unit 404 received a notification of a print job midway process and result from the image forming apparatus 106. A URL 1008 is the location where information about the print job is described, and has a form such as "http:// . . . ."

<Example of Operation Procedure of Print System of Embodiment>

(Example of History Information Creation Procedure of Print Service Unit 404)

Figure 11A:
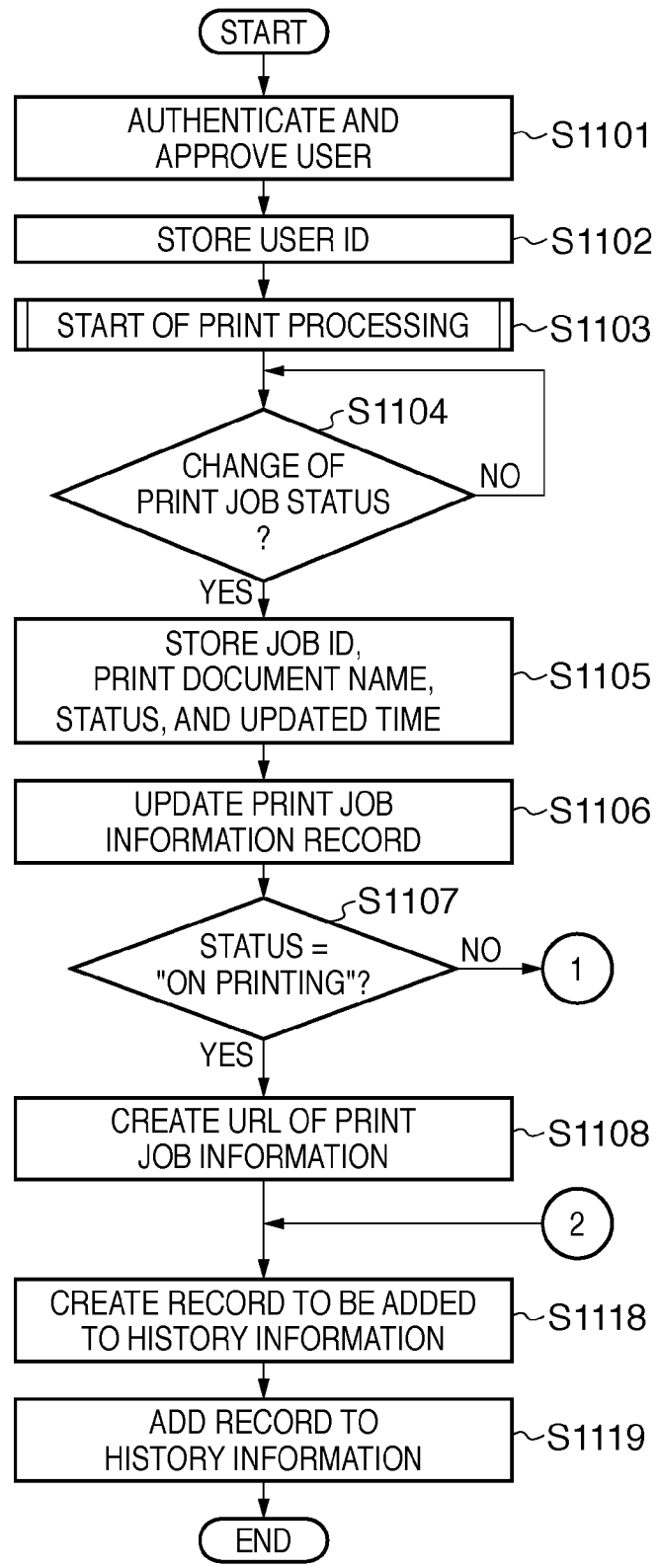
FIGS. 11A and 11B are flowcharts illustrating an example of the operation procedure when creating history information.
Figure 11B:
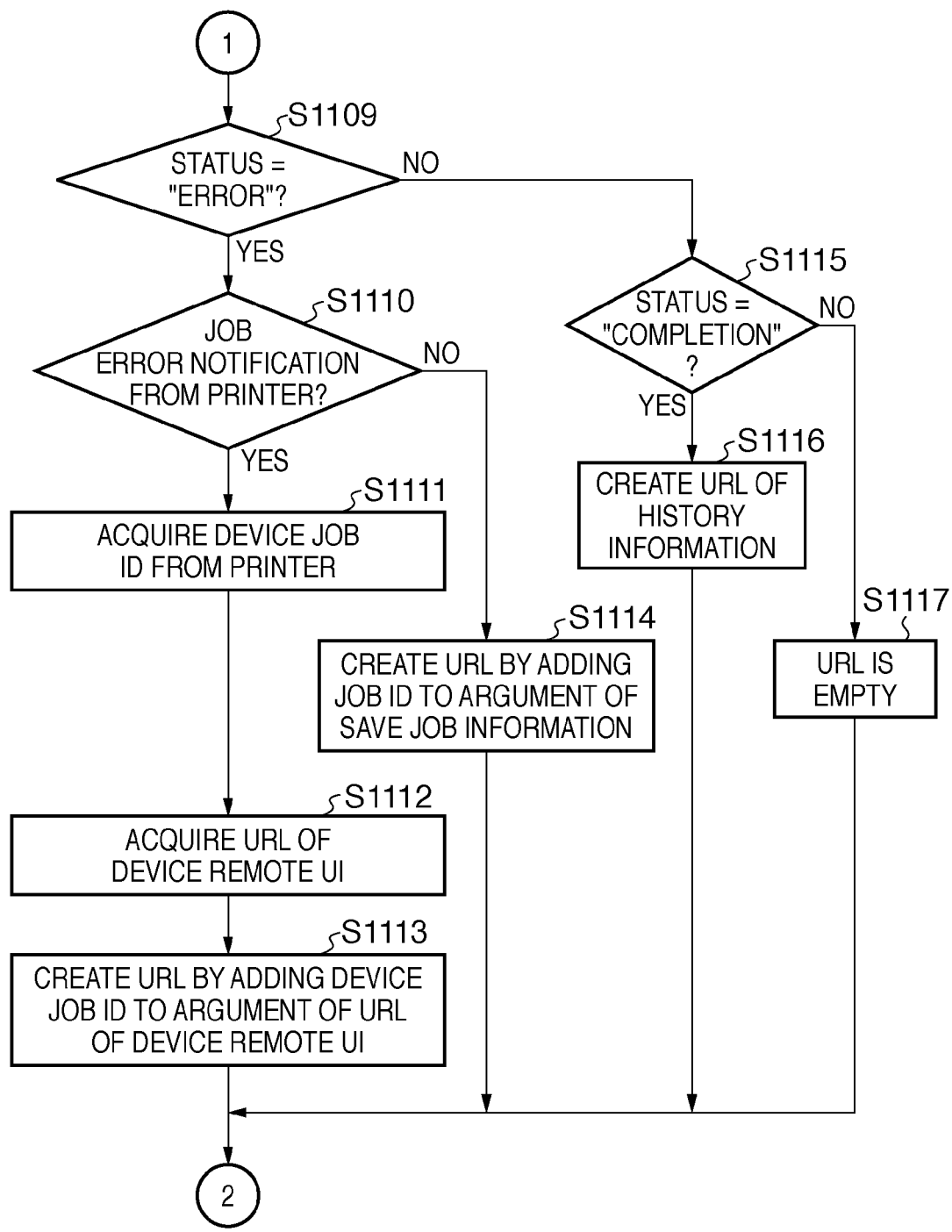

The control unit 705 of the print service unit 404 includes a CPU, RAM, ROM, HDD, and the like. The procedure shown in the flowchart of FIGS. 11A and 11B is stored in one of the storage media, in other words, the RAM, ROM, and HDD of the control unit 705 and executed by the CPU 200.

Assume that the user information of the user who has input a print request coincides with the user information registered in the authentication service unit 406, and it is judged that the authenticated user can print the save job (S1101). The CPU 200 of the control unit 705 stores, in the RAM 202, the user ID of the user who has input the print request (S1102), and starts printing (S1103). The print processing is general processing, and a description thereof will be omitted. Upon detecting the change of the print job status (YES in step S1104), the CPU 200 of the control unit 705 stores, in the RAM 202, the job identification ID, document name, status after the change, and notification reception time (to be referred to as the updated time hereinafter) (S1105). Next, the CPU 200 of the control unit 705 updates the print job information record in the print job information table managed by the database service unit 405 (S1106). After that, the CPU 200 of the control unit 705 judges the status after the change. First, the CPU 200 of the control unit 705 judges whether the status after the change is "on printing" (in other words, "on operation") (S1107). Upon judging that the status is "on printing" (YES in step S1107), the CPU 200 of the control unit 705 creates a URL (first address) that enables to refer to the print job information record in the print job information table, and stores it in the RAM 202 (S1108).

Upon judging that the status is not "on printing" (NO in step S1107), the CPU 200 of the control unit 705 judges whether the status is "error" (S1109). Upon judging that the status is "error" (YES in step S1109), the CPU 200 of the control unit 705 judges whether a print job error notification has been received from the image forming apparatus 106 (S1110). Note that if a print job error notification has been received from the image forming apparatus 106, it means that the save job data has reached the image forming apparatus 106, and the image forming apparatus has started print processing. If a print job error notification has not been received from the image forming apparatus 106, it means that some type of error has occurred before the save job data reaches the image forming apparatus 106.

If a print job error notification has been received from the image forming apparatus 106 (YES in step S1110), the CPU 200 of the control unit 705 receives a device job ID sent from the image forming apparatus 106 (S1111). The device job ID is used to uniquely identify a print job in the image forming apparatus 106. The device job ID may be included in print job process/result information or acquired by another method. The CPU 200 of the control unit 705 acquires the URL (third address) of a device remote UI which enables to directly refer to the information in the image forming apparatus 106 (S1112). The image forming apparatus 106 incorporates a Web server. Accessing the URL of the device remote UI using a Web browser or the like allows to acquire information (for example, print job information or printer status) in the image forming apparatus 106. After that, the CPU 200 of the control unit 705 creates a URL by adding the device job ID to the argument of the URL of the device remote UI, and stores it in the RAM 202 (S1113). For example, 1401 in FIG. 14A to be described later indicates a detailed example of the created URL. In this example of a print job, "http://printerA.example.com/_job/id=20081010150003" is the URL of the device remote UI, and "20081010150003" is the device job ID. Accessing the URL using a Web browser or the like enables to refer to the print job information and printer status of the device job ID "20081010150003" in the image forming apparatus 106. If the print job error notification has not been received from the image forming apparatus 106 (NO in step S1110), the CPU 200 of the control unit 705 creates a URL (fourth address) that enables to refer to the save job information record in the save job information table, and stores it in the RAM 202 (S1114). A detailed example of the URL created here is "http://canonprintserver.jp/dpclist?jobid=2" indicated by 1501 in FIG. 15A.

Upon judging that the status is not "error" (NO in step S1109), the CPU 200 of the control unit 705 judges next whether the status is "completion" (S1115). Upon judging that the status is "completion" (YES in step S1115), the CPU 200 of the control unit 705 creates a URL (second address) that enables to refer to a history information record, and stores it in the RAM 202 (S1116). Upon judging that the status is not "completion" (NO in step S1115), the CPU 200 of the control unit 705 creates no URL (S1117).

Then, the CPU 200 of the control unit 705 creates a history information record from the user ID, job identification ID, document name, status, updated time, and URL stored in the RAM 202 (S1118). The history information record is added to the history information table managed by the database service unit 405 (S1119).

Note that in this embodiment, if the status is not "completion" in step S1117, no URL is created. However, the URL of print job information may be created, or another URL may be created. In this embodiment, a different URL is thus determined as the URL of history information in correspondence with a status such as on printing (on operation), error, or completion.

(Detailed Example of History Information Table)

FIGS. 13, 14A, and 15A show detailed examples of the history information table managed by the database service unit 405. Reference numerals in FIGS. 13, 14A, and 15A correspond to the same reference numerals in FIG. 10. FIG. 13 shows a state in which the print server 104 has started print processing of three save jobs "doc1" (job identification ID 1), "doc2" (job identification ID 2), and "doc3" (job identification ID 3). If a print job has reached the image forming apparatus 106, and an error has occurred in the image forming apparatus 106 during printing, the history information table managed by the database service unit 405 stores information as shown in FIG. 14A. As compared to FIG. 13, the history information 1401 representing that an error has occurred in the print job "doc2" (job identification ID 2) is added. The URL of the device remote UI is stored as the URL. On the other hand, if an error has occurred before a print job reaches the image forming apparatus 106, the history information table managed by the database service unit 405 stores information as shown in FIG. 15A. As compared to FIG. 13, the history information 1501 representing that an error has occurred in the print job "doc2" (job identification ID 2) is added. A URL that enables to refer to the save job information of job identification ID 2 is stored as the URL.

(Example of RSS File Creation Procedure of Web Server 402)

Figure 12A:
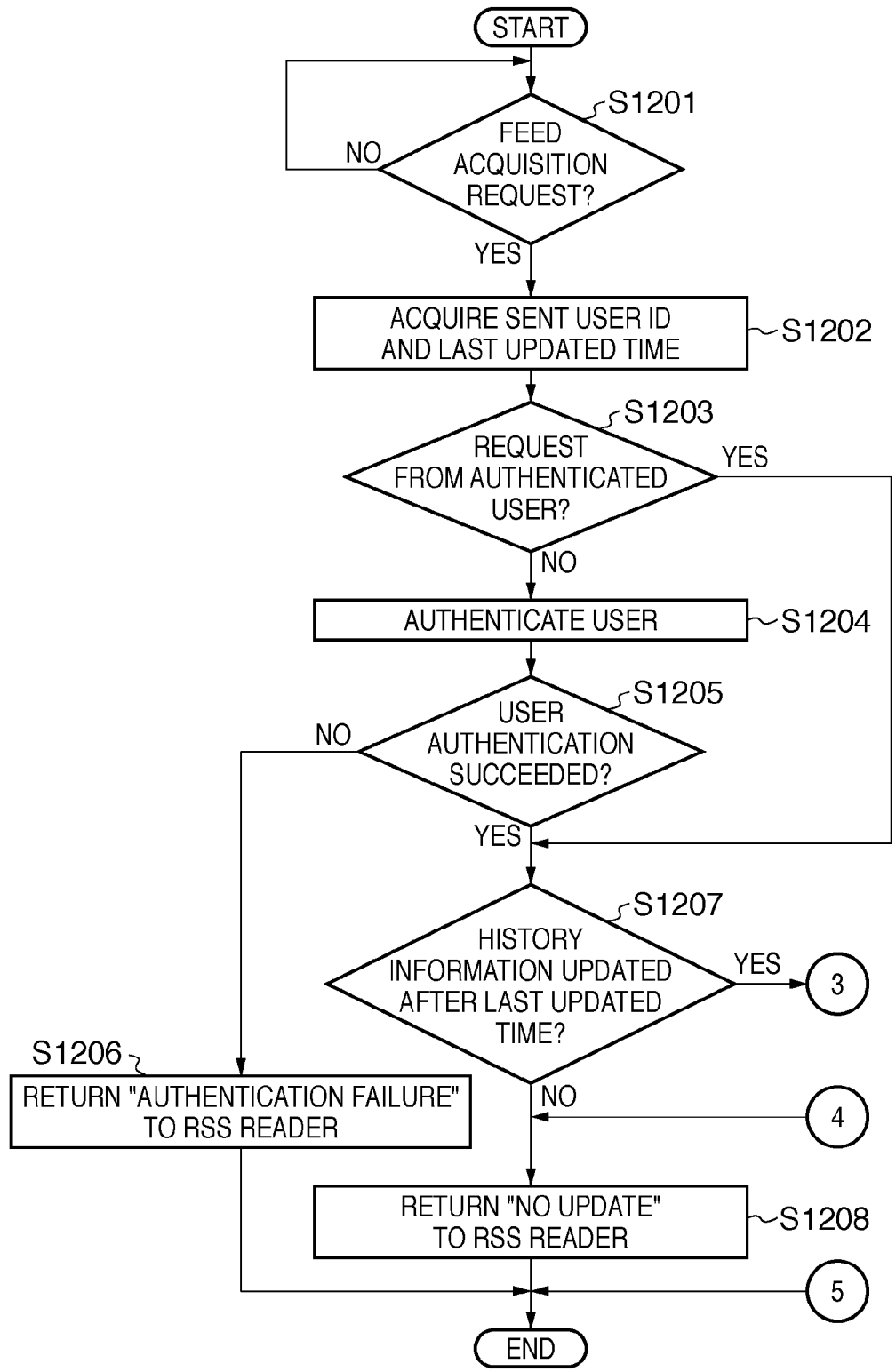
FIGS. 12A and 12B are flowcharts illustrating an example of the operation procedure when creating an RSS file.
Figure 12B:
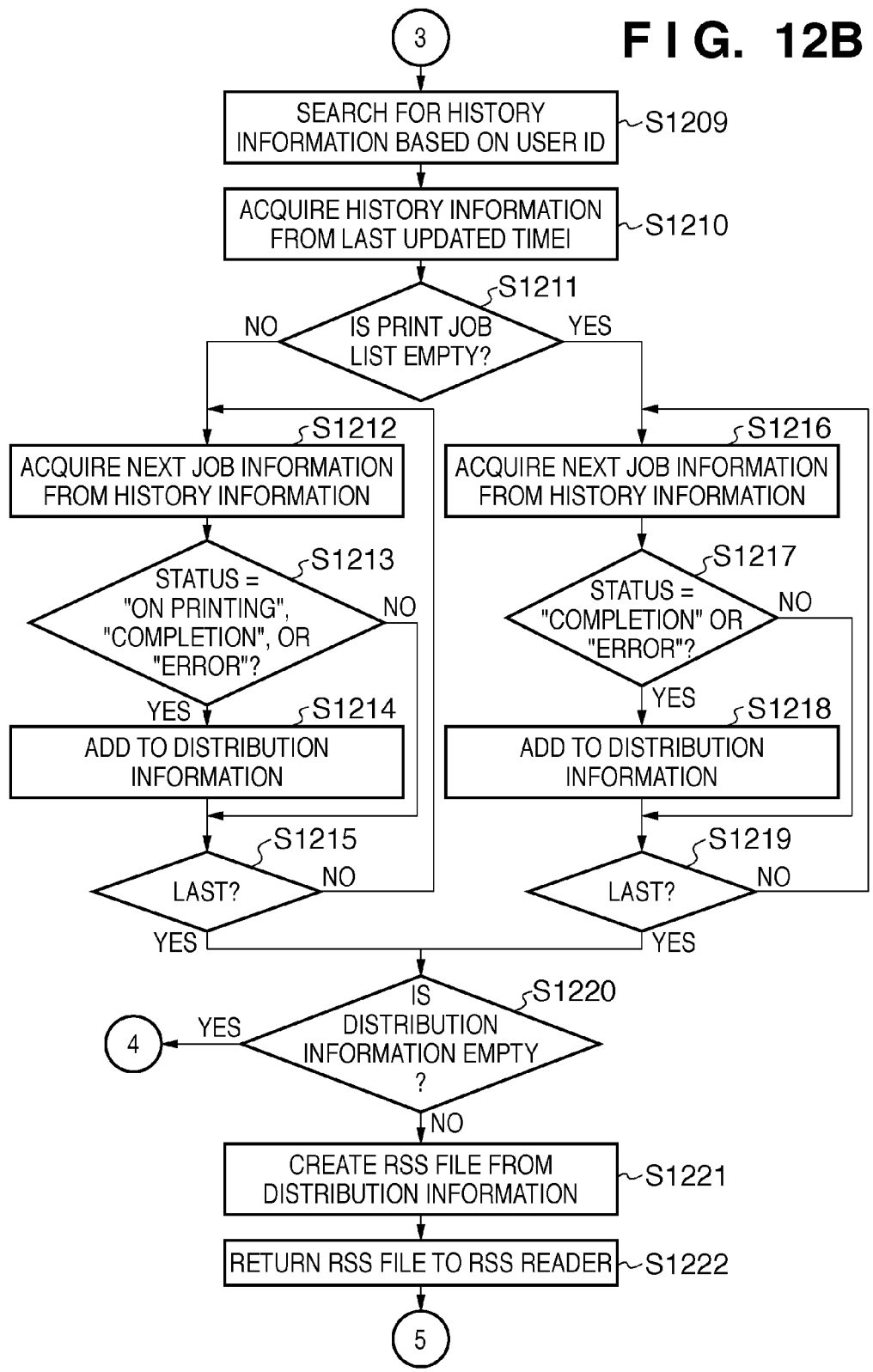

The control unit 505 of the Web server 402 includes a CPU, RAM, ROM, HDD, and the like. The procedure shown in the flowchart of FIGS. 12A and 12B is stored in one of the storage units, in other words, the RAM, ROM, and HDD of the control unit 505 and executed by the CPU 200.

The transmission and reception unit 501 receives an RSS feed acquisition request that is a job history browsing request from the RSS reader (YES in step S1201). The CPU 200 of the control unit 505 acquires a user ID sent from the RSS reader and the last updated time, and stores them in the RAM 202 (S1202). Next, the CPU 200 of the control unit 505 judges using the user ID whether the request has been input by an authenticated user (S1203). Upon judging that the user is not authenticated (NO in step S1203), the CPU 200 of the control unit 505 performs authentication processing (S1204). If the authentication has succeeded (YES in step S1205), the process advances to the next process (S1207). If the authentication processing has failed (NO in step S1205), the CPU 200 of the control unit 505 returns "authentication failure" to the RSS reader (S1206).

If the authentication has succeeded (YES in step S1205), or the request has been input by an already authenticated user (YES in step S1203), the CPU 200 of the control unit 505 judges whether a history information record has been added at the last updated time (S1207). Upon judging that a history information record has been added at the last updated time (YES in step S1207), the CPU 200 of the control unit 505 searches the history information table using the user ID as a key, and acquires a history information record having a coincident user ID (S1209). The CPU 200 of the control unit 505 also acquires the last updated time from the RAM 202, and acquires history information records from the last updated time (S1210). The CPU 200 of the control unit 505 then judges, by referring to the print job information table, whether a job currently on printing exists (S1211).

Upon judging that a job currently on printing exists (NO in step S1211), the CPU 200 of the control unit 505 stores, out of the history information records from the last updated time, a history information record with a status "on printing", "completion", or "error" as distribution information (DistInfo), and stores it in the RAM (S1212 to S1215). Upon judging that no job currently on printing exists (YES in step S1211), the CPU 200 of the control unit 505 stores, out of the history information records from the last updated time, a history information record with a status "completion" or "error" as distribution information (DistInfo), and stores it in the RAM (S1216 to S1219).

After that, the CPU 200 of the control unit 505 judges whether the distribution information (DistInfo) is empty (S1220). Upon judging that the distribution information (DistInfo) is not empty (NO in step S1220), the CPU 200 of the control unit 505 causes the response generation unit 509 to create an RSS file based on the distribution information (DistInfo) (S1221). The CPU 200 of the control unit 505 causes the transmission and reception unit 501 to transmit the created RSS file to the RSS reader (S1222).

Upon judging that no history information record has been added at the last updated time (NO in step S1207), the CPU 200 of the control unit 505 causes the transmission and reception unit 501 to transmit, to the RSS reader, information representing that no update has been done (S1208). Similarly, upon judging that the distribution information (DistInfo) is empty (YES in step S1220), the CPU 200 of the control unit 505 causes the transmission and reception unit 501 to transmit, to the RSS reader, information representing that no update has been done (S1208).

(Detailed Example of RSS File)

FIGS. 14B and 15B show detailed examples of an RSS file created in the flowchart of FIGS. 12A and 12B based on the history information tables shown in FIGS. 14A and 15A. Note that an RSS file having the Atom format is shown as an example of the RSS file. However, a file having the RSS format may be used, as a matter of course.

More specifically, when the history information table managed by the database service unit 405 has the state shown in FIG. 14A, an RSS feed acquisition request is received from the RSS reader together with the user ID "101" and the last updated time "2008/10/10 15:00:01". Then, an RSS file shown in FIG. 14B is created.

Referring to FIG. 14B, a "title" element 1402 indicates the title of the feed. An "id" element 1403 indicates the identifier of the feed. A "link" element 1404 indicates the link to a feed 1412 on the print server. An "updated" element 1405 indicates the time the feed 1412 has been generated (updated). A "title" element 1406 indicates the document name of the print job. A "summary" element 1408 indicates the status of the print job. A "modified" element 1409 indicates the time the status has been updated. A "link" element 1410 indicates the reference destination of information about the print job. A "job ID" element 1411 indicates the job identification ID of the print job.

Alternatively, in the state shown in FIG. 15A, an RSS feed acquisition request is received from the RSS reader together with the user ID "101" and the last updated time "2008/10/10 15:00:01". Then, an RSS file shown in FIG. 15B is created. The elements in FIG. 15B are the same as in FIG. 14B, and a description thereof will not be repeated.

(Example of Operation Procedure of RSS Reader in Web Browser 401)

The RSS reader is preset to refer to a URL in a received RSS feed if an element in the feed has a specific value. For example, the RSS reader is set to refer to the URL of the "link" element 1410 if the value of the "summary" element 1408 is "error". In this embodiment, assume that the RSS reader is set to refer to the URL of the "link" element 1410 when the value of the "summary" element 1408 of an RSS feed coincides with one of "on printing", "completion", and "error". The value may coincide with another value, or another element may be referred to, as a matter of course.

Figure 16:
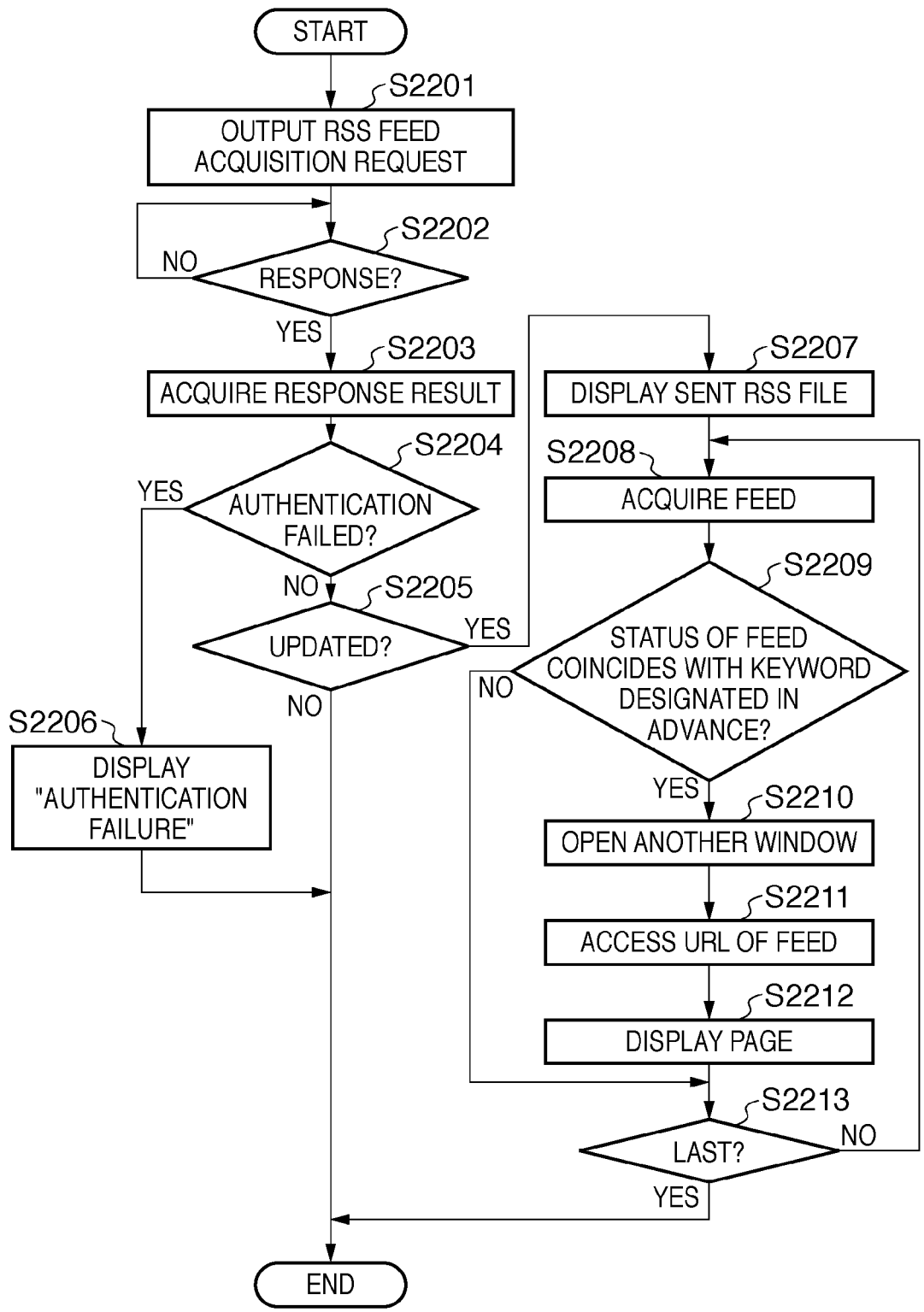
FIG. 16 is a flowchart illustrating an example of the operation procedure of an RSS reader.

In the flowchart of the RSS reader shown in FIG. 16, the CPU 200 of the client apparatus 101 sends an RSS feed acquisition request to the Web server 402 (S2201). Upon receiving a response from the Web server 402 (YES in step S2202), the client apparatus acquires the response result (S2203). If the response result indicates an authentication failure (YES in step S2204), the CPU 200 of the client apparatus 101 displays the authentication failure on the display 207 (S2206), and ends the program. If the response result does not indicate an authentication failure (NO in step S2204), the CPU 200 of the client apparatus 101 judges whether an RSS file has been sent (S2205). Upon judging that no RSS file has been sent (NO in step S2205), the CPU 200 of the client apparatus 101 ends the program without updating the display on the display 207.

Upon judging that an RSS file has been sent (YES in step S2205), the CPU 200 of the client apparatus 101 displays the RSS file on the display 207 (S2207). Next, the CPU 200 of the client apparatus 101 sequentially acquires a sent RSS feed (S2208), and judges whether the value of the "summary" element of the feed coincides with one of "on printing", "completion", and "error" (S2209). Upon judging that the value coincides with one of "on printing", "completion", and "error" (YES in step S2209), the CPU 200 of the client apparatus 101 acquires the value (URL) of the "link" element, and displays the page on the display 207 by referring to the URL from another window opened in the display region of the display 207 (S2210 to S2213).

(Example of Display Screen of Web Browser)

Figure 17:
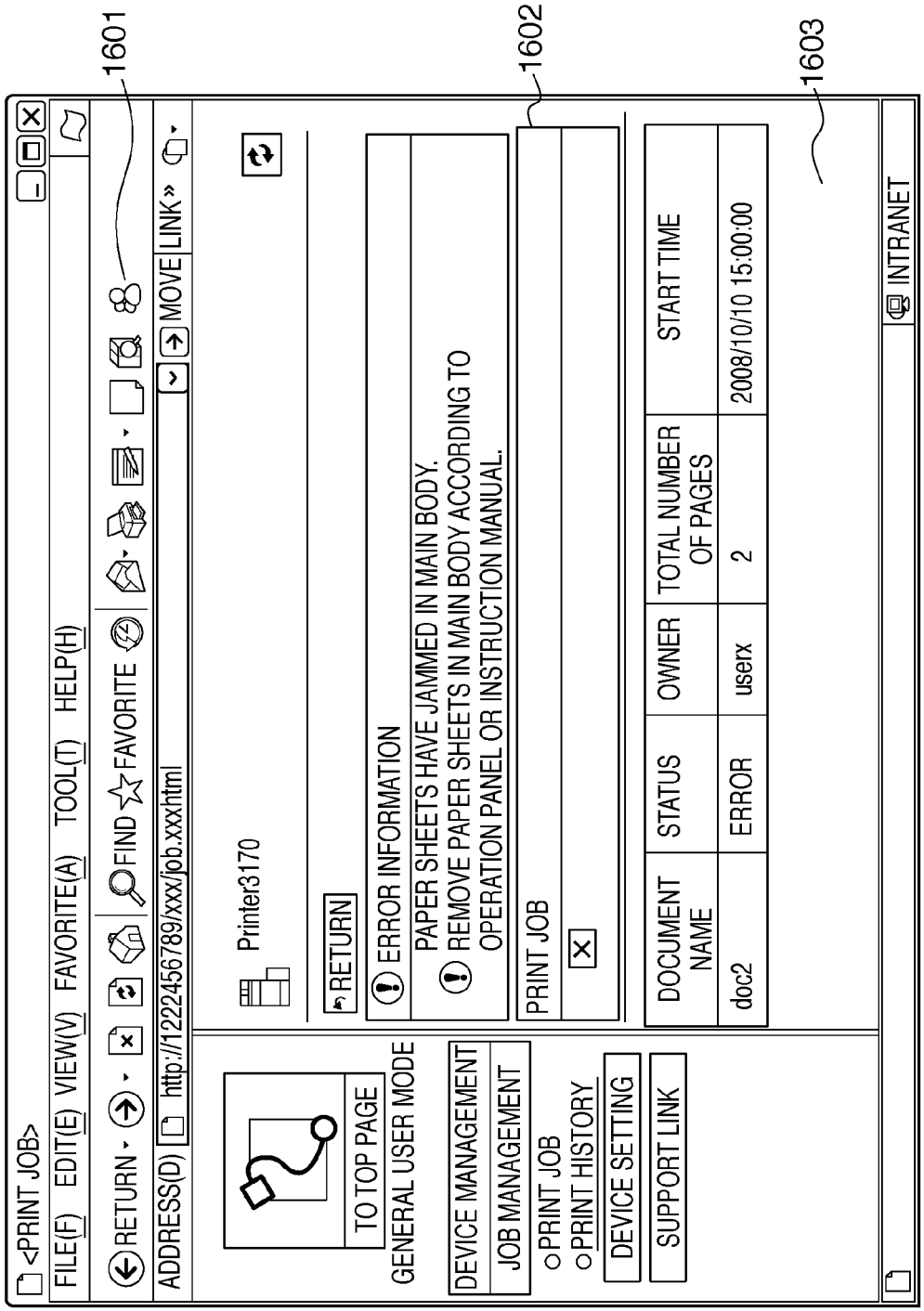
FIG. 17 is a view showing an example of the remote UI screen of a printing apparatus displayed on the RSS reader.

When a print job has reached the image forming apparatus 106, and an error has occurred in the image forming apparatus 106 during printing, the history information table managed by the database service unit 405 stores information as shown in FIG. 14A. When the RSS reader sends an RSS feed acquisition request together with the user ID "101" and the last updated time "2008/10/10 15:00:01" in this state, the RSS file shown in FIG. 14B is returned. The RSS reader refers to the URL of the "title" element 1402 in FIG. 14B so that the page shown in FIG. 17 is displayed on the display 207 of the RSS reader. FIG. 17 shows a device remote UI screen which displays a printer status 1602, print job information 1603, and the like.

Figure 18:
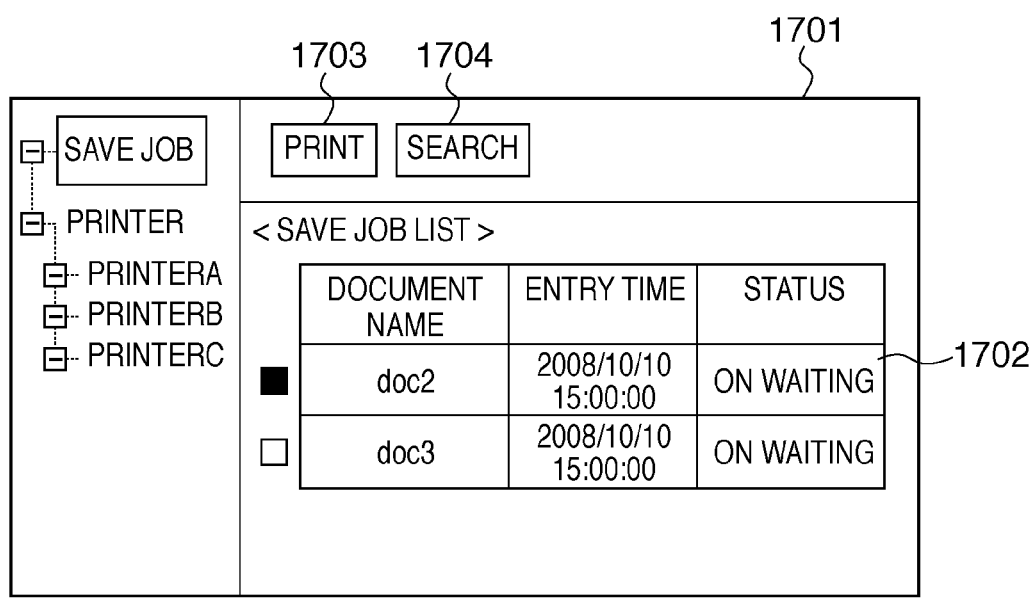
FIG. 18 is a view showing an example of a print job list displayed on the RSS reader.

If an error has occurred before the print job reaches the image forming apparatus 106, the history information table managed by the database service unit 405 stores information as shown in FIG. 15A. When the RSS reader sends an RSS feed acquisition request together with the user ID "101" and the last updated time "2008/10/10 15:00:01" in this state, the RSS file shown in FIG. 15B is returned. The RSS reader refers to the URL of the "title" element 1502 in FIG. 15B so that the page shown in FIG. 18 is displayed on the display 207 of the RSS reader. FIG. 18 shows the save job list display screen of the print server 104, which displays a save job 1702 of document name "doc2". The user selects the save job 1702 of document name "doc2" in this screen, and presses a print button 1703. Print processing of the save job data can be executed by selecting a printer different from the printer in which the error has occurred (to which the save job data cannot be transmitted).

(Another Example of RSS File Creation Procedure of Web Server 402)

In the example of the RSS file creation procedure shown in FIGS. 12A and 12B, the RSS reader acquires the value (URL) of the "link" element of an RSS feed, and displays the page by referring to the URL. However, the print job status changes every instant. For this reason, for example, the status which was "on printing" at the timing of RSS file creation may change to "print error" in the image forming apparatus 106 when the RSS reader is going to refer to the URL of the RSS feed. In another example of the RSS file creation procedure, if an additional record exists in the history information at the time of access from the RSS reader to the URL on the print server 104, the access is redirected to the URL indicating the latest information.

Figure 19:
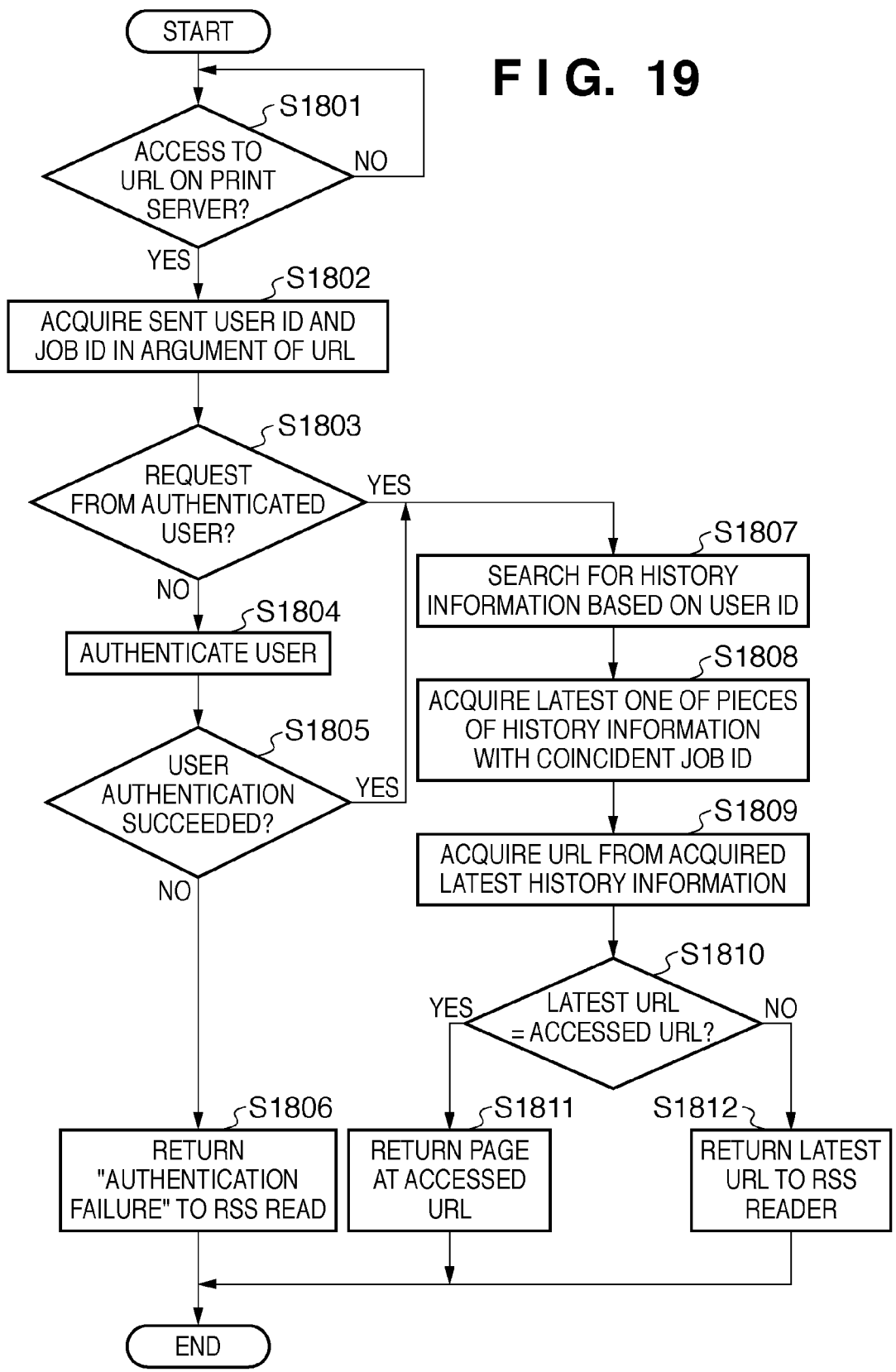
FIG. 19 is a flowchart illustrating another example of the operation procedure when creating an RSS file.

FIG. 19 is a flowchart of response processing of the Web server 402 for a request to acquire a page on the print server 104. Note that the control unit 505 of the Web server 402 includes a CPU, RAM, ROM, HDD, and the like. The procedure shown in the flowchart of FIG. 19 is stored in one of the storage media, in other words, the RAM, ROM, and HDD and executed by the CPU 200 of the control unit 505.

The transmission and reception unit 501 receives a page acquisition request from the RSS reader (step S1801). The CPU 200 of the control unit 505 acquires a user ID sent from the RSS reader and the job identification ID included in the URL, and stores them in the RAM 202 (S1802). The accessed URL is also stored in the RAM 202. Next, the CPU 200 of the control unit 505 judges using the user ID whether the request has been input by an authenticated user (S1803).

Upon judging that the user is not authenticated (NO in step S1803), the CPU 200 of the control unit 505 performs authentication processing (S1804). If the authentication has succeeded (YES in step S1805), the process advances to the next process. If the authentication processing has failed (NO in step S1805), "authentication failure" is returned to the RSS reader (S1806), and the processing ends.

If the authentication has succeeded (YES in step S1805), or the request has been input by an already authenticated user (YES in step S1803), the CPU 200 of the control unit 505 acquires the user ID from the RAM 202. The CPU 200 of the control unit 505 searches the history information table using the user ID as a key, and acquires a history information record having a coincident user ID (S1807). The CPU 200 of the control unit 505 also acquires the job identification ID from the RAM 202, and acquires the latest one of the acquired history information records (S1808). The CPU 200 of the control unit 505 also acquires the URL from the latest history information record (S1809). The CPU 200 of the control unit 505 compares the URL acquired from the latest history information record with that acquired from the RAM 202 (S1810). If the URLs coincide with each other (YES in step S1810), the CPU 200 of the control unit 505 returns a page at the location represented by the URL (S1811). If the URLs do not coincide (NO in step S1810), a page at the location represented by the URL acquired from the latest history information record is returned (S1812).

This enables the RSS reader to display latest information if information on the print server 104 should be referred to at the timing of RSS file creation, but the print job status has been updated when the RSS reader is going to refer to the URL.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117048, filed on May 13, 2009, which is hereby incorporated by reference herein in its entirety.

What is claimed is:

1. An information processing apparatus which provides a print service that transmits, in response to receiving a print request from a user, a print job corresponding to the print request to a printer, in a system operating under a Web environment in which the information processing apparatus, which provides the service by operating a Web server, and a client apparatus, which is provided with the service by operating a Web browser, are connected via a network, the information processing apparatus comprising:

a storage unit configured to store a print job history in which a status of the print job corresponding to the print request and a URL (Uniform Resource Locator) for browsing a page describing information about the print job are corresponded with a user ID of a user who requests the print service;

an acquisition unit configured to acquire a print job history having a user ID matching to a user ID of a user who sends a request for browsing a print job history, from print job histories stored in the storage unit, when the Web server receives the request for browsing from the user of the client apparatus via the Web browser;

a creation unit configured to create, as distribution information, a file for distributing update information, including a summary for notifying the status of the print job and a URL for browsing information about the print job, based on the print job history acquired by the acquisition unit;

a transmission unit configured to transmit, as the distribution information, the file created by the creation unit to the Web browser;

a determination unit configured to determine, in response to an access from the client apparatus which receives the distribution information and displays the summary according to the URL included in the distribution information, whether the URL used on the access accords with a URL of the latest print job history among the print job history, stored in the storage unit, corresponding to the print job; and a return unit configured, when the determination unit determines that the URL used on the access accords with the URL of the latest print job history, to return a page corresponding to the URL used on the access to the client apparatus, and when the determination unit determines that the URL used on the access does not accord with the URL of the latest print job history, to return the URL of the latest print job history information to the client apparatus.

2. The information processing apparatus according to claim 1, wherein the distribution information generated by the creation unit is represented by one format of RDF Site Summary, Rich Site Summary, and Really Simple Syndication, a summary for notifying a status of the print job is inserted into a title element of RSS format, and a URL for browsing information about the print job is inserted into a link element of RSS format.

3. The information processing apparatus according to claim 1, wherein the transmission unit transmits the distribution information after the last time that the distribution information has been transmitted to the client apparatus.

4. The information processing apparatus according to claim 1, wherein, in case that there is a print job on printing among print jobs corresponding to the user when an acquisition request for the distribution information is received, the transmission unit transmits the distribution information including a summary for notifying three status of error, completion, and on printing, and in a case that there is no print job on printing when the acquisition request for the distribution information is received, the transmission unit transmits the distribution information including a summary for notifying two status of error and completion.

5. A method of controlling an information processing apparatus which provides a print service that transmits, in response to receiving a print request from a user, a print job corresponding to the print request to a printer, in a system operating under a Web environment in which the information processing apparatus, which provides the service by operating a Web server, and a client apparatus, which is provided with the service by operating a Web browser, are connected via a network, the method comprising the steps of:

storing, in a storage unit, a print job history in which a status of the print job corresponding to the print request and a URL (Uniform Resource Locator) for browsing a page describing information about the print job are corresponded with a user ID of a user who requests the service;

acquiring a print job history having a user ID matching to a user ID of a user who sends a request for browsing a print job history, from print job histories stored in the storage unit, when the Web server receives the request for browsing from the user of the client apparatus via the Web browser;

creating, as distribution information, a file for distributing update information, including a summary for notifying the status of the print job and a URL for browsing information about the print job, based on the print job history acquired in the acquiring step;

transmitting, as the distribution information, the file created in the creating step to the Web browser;

determining, in response to an access from the client apparatus which receives the distribution information and displays the summary according to the URL included in the distribution information, whether the URL used on the access accords with a URL of the latest print job history among the print job history, stored in the storage unit, corresponding to the print job; and a return step of, when the determining step determines that the URL used on the access accords with the URL of the latest print job history, returning a page corresponding to the URL used on the access to the client apparatus, and when the determining step determines that the URL used on the access does not accord with the URL of the latest print job history, returning the URL of the latest print job history information to the client apparatus.

6. The method according to claim 5, wherein the distribution information generated in the creating step is represented by one format of RDF Site Summary, Rich Site Summary, and Really Simple Syndication, a summary for notifying a status of the print job is inserted into a title element of RSS format, and a URL for browsing information about the print job is inserted into a link element of RSS format.

7. The method according to claim 5, wherein the transmitting step transmits distribution information generated after the last time that the distribution information has been transmitted to the client apparatus.

8. The method according to claim 5, wherein, in a case that there is a print job on printing among print jobs corresponding to the user when an acquisition request for the distribution information is received, the transmitting step transmits distribution information including a summary for notifying three status of error, completion, and on printing, and in a case that there is no print job on printing when the acquisition request for the distribution information is received, the transmitting step transmits distribution information including a summary for notifying two status of error and completion.

9. A non-transitory computer-readable storage medium storing a program which causes a computer to execute steps of a method of controlling an information processing apparatus according to claim 5.

* * * * *